United States Patent
Farkas et al.

(10) Patent No.: US 7,127,625 B2
(45) Date of Patent: Oct. 24, 2006

(54) APPLICATION MANAGEMENT BASED ON POWER CONSUMPTION

(75) Inventors: Keith Istvan Farkas, San Carlos, CA (US); Parthasarathy Ranganathan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 479 days.

(21) Appl. No.: 10/654,473

(22) Filed: Sep. 4, 2003

(65) Prior Publication Data

US 2005/0055590 A1    Mar. 10, 2005

(51) Int. Cl.
*G06F 1/26*    (2006.01)
(52) U.S. Cl. .............. 713/320; 713/300; 713/323
(58) Field of Classification Search .......... 713/320, 713/310, 300, 323
See application file for complete search history.

(56) References Cited

U.S. PATENT DOCUMENTS

| | | | | |
|---|---|---|---|---|
| 5,898,870 | A * | 4/1999 | Okuda et al. ............. | 718/104 |
| 6,080,204 | A * | 6/2000 | Mendel .................... | 716/7 |
| 6,385,639 | B1 * | 5/2002 | Togawa .................... | 709/200 |
| 6,389,448 | B1 * | 5/2002 | Primak et al. ............ | 718/105 |
| 6,986,069 | B1 * | 1/2006 | Oehler et al. ............ | 713/320 |
| 2002/0016785 | A1 * | 2/2002 | Sirgany .................... | 706/46 |
| 2002/0152305 | A1 * | 10/2002 | Jackson et al. .......... | 709/224 |
| 2004/0153867 | A1 * | 8/2004 | McAlinden et al. ...... | 714/47 |
| 2005/0278520 | A1 * | 12/2005 | Hirai et al. ................ | 713/1 |

OTHER PUBLICATIONS

Flinn, Jason et al., "Reducing the Energy Usage of Office Applications", Nov. 2001.
Narayanan, Dushyanth et al., "Using History to Improve Mobile Application Adaptation", Dec. 2000.
Flinn, Jason et al., "Powerscope: A Tool for Profiling the Energy Usage of Mobile Applications", Feb. 1999.
Flinn, Jason et al., "Energy-aware adaptation for mobile applications", Dec. 1999.
Flinn, Jason, "Extending Mobile Computer Battery Life through Energy-Aware Adaptation", Dec. 2001.
Flinn, Jason et al., "Power and Energy Characterization of the Itsy Pocket Computer" (Version 1.5), Feb. 2000.
Farkas, Keith I., "Quantifying the Energy Consumption of a Pocket Computer and a Java Virtual Machine", Jun. 2000.

* cited by examiner

*Primary Examiner*—Chun Cao
*Assistant Examiner*—Malcolm Cribbs
(74) *Attorney, Agent, or Firm*—Richard P. Lange

(57) ABSTRACT

A plurality of computer systems is operable to execute an application. A power consumption is determined for a first computer system if the first computer system were to execute the application, and a power consumption is determined for at least one other computer system if the second computer system were to execute the application. One of the computer systems is selected to execute the application based on the determined power consumptions.

27 Claims, 6 Drawing Sheets

| TimePeriod | Resource 1 | Resource 2 | Resource 3 | Resource N | Power | Temperature |
|---|---|---|---|---|---|---|
| 310 $T_S$ | $R_{1S(A)}$ | $R_{2S(A)}$ | $R_{3S(A)}$ | $R_{NS(A)}$ | $P_{S(A)}$ | $TEMP_{S(A)}$ |
| 320 $T_T$ | $R_{1T(A)}$ | $R_{2T(A)}$ | $R_{3T(A)}$ | $R_{NT(A)}$ | $P_{T(A)}$ | $TEMP_{T(A)}$ |
| 330 $T_U$ | $R_{1U(A)}$ | $R_{2U(A)}$ | $R_{3U(A)}$ | $R_{NU(A)}$ | $P_{U(A)}$ | $TEMP_{U(A)}$ |
| 340 $T_{FUT(A)}$ | $R_{1FUT(A)}$ | $R_{2FUT(A)}$ | $R_{3FUT(A)}$ | $R_{NFUT(A)}$ | $P_{FUT(A)}$ | $TEMP_{FUT(A)}$ |
| 350 $T_S$ | $R_{1S(B)}$ | $R_{2S(B)}$ | $R_{3S(B)}$ | $R_{NS(B)}$ | $P_{S(B)}$ | $TEMP_{S(B)}$ |
| 360 $T_T$ | $R_{1T(B)}$ | $R_{2T(B)}$ | $R_{3T(B)}$ | $R_{NT(B)}$ | $P_{T(B)}$ | $TEMP_{T(B)}$ |
| 370 $T_U$ | $R_{1U(B)}$ | $R_{2U(B)}$ | $R_{3U(B)}$ | $R_{NU(B)}$ | $P_{U(B)}$ | $TEMP_{U(B)}$ |
| 380 $T_{FUT(B)}$ | $R_{1FUT(B)}$ | $R_{2FUT(B)}$ | $R_{3FUT(B)}$ | $R_{NFUT(B)}$ | $P_{FUT(B)}$ | $TEMP_{FUT(B)}$ |
| 390 $T_{TOTAL}$ | $R_{1TOTAL}$ | $R_{2TOTAL}$ | $R_{3TOTAL}$ | $R_{NTOTAL}$ | $P_{TOTAL}$ | $TEMP_{TOTAL}$ |

Rows 310–340 are grouped as App A; rows 350–380 are grouped as App B.

FIG. 3

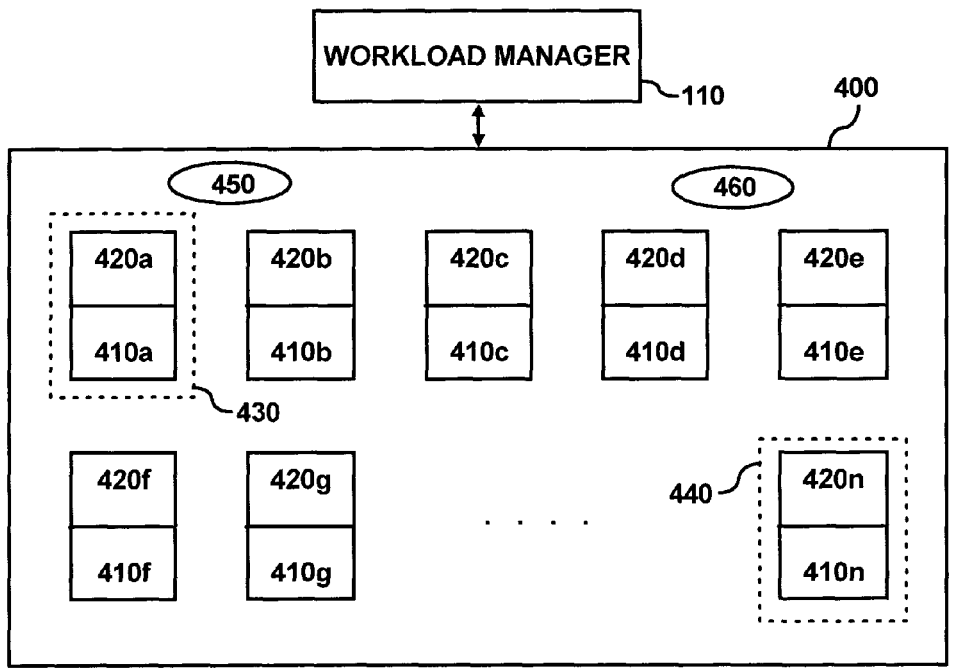

FIG. 4

APPLICATION MANAGEMENT BASED ON POWER CONSUMPTION

TECHNICAL FIELD

This invention relates generally to managing software applications based on power consumption. More particularly, the invention relates to selecting a computer system for executing a software application based on a predicted power consumption of a computer system executing the application.

BACKGROUND

Computer systems are becoming increasingly complicated everyday. As chip designers strive to increase performance of the chips used in typical computer systems, power consumption by these chips has correspondingly increased. Furthermore, when these computer systems are grouped together, such as servers in a rack, the total power consumption of the group can exceed 20 MW. In addition, cooling systems needed to remove the large amount of heat dissipated by the computer systems in the rack also tend to consume a significant amount of power. When considering a data center, which may house a large number of racks, power is a significant factor in the cost of ownership of the multi-computer systems and installations.

One conventional approach for conserving power includes voltage and frequency scaling. Voltage and frequency scaling is used to reduce the power consumption of a processor when it is determined that the processor is not being fully utilized. Voltage and frequency scaling typically comprises reducing the clock speed of the processor, which results in a power savings. However, the power savings are minimal, and in a multi-computer system the impact on power consumption is limited.

SUMMARY OF THE EMBODIMENTS

According to an embodiment, a method of managing computer applications comprises determining computer resource needs of an application. Based on the computer resource needs of the application, a first power consumption of a first computer system is determined if the first computer system were to execute the application. A power consumption of at least one other computer system is also determined if that computer system were to execute the application. One of the computer systems is selected to execute the application based on the determined power consumptions.

According to another embodiment, a system for managing applications operable to be executed on a plurality of computer systems comprises a plurality of computer systems and a workload manager platform. The workload manager platform is operable to manage applications executing or to be executed on the plurality of computer systems. The workload manager platform estimates power consumptions of at least two of the computer systems if these computer systems were to execute an application. The workload manager platform selects one of the computer systems to execute the application based at least on a smaller one of the two power consumptions.

According to another embodiment, an apparatus comprises means for determining computer resource needs of an application. The apparatus further comprises means for determining, based on the computer resource needs of the application, a first power consumption of a first computer system if the first computer system were to execute the application. The means for determining also determines for at least one other computer system a power consumption if the other computer system were to execute the application. Based on the determined power consumptions, a means for selecting selects one of the computer systems to execute the application.

BRIEF DESCRIPTION OF THE DRAWINGS

The present invention is illustrated by way of example and not limitation in the accompanying figures in which like numeral references refer to like elements, and wherein:

FIG. 3 illustrates examples of computer resources data, power consumption data and temperature data used to select a computer system for executing an application;

FIG. 4 illustrates a data center, according to an embodiment of the invention;

DETAILED DESCRIPTION OF EMBODIMENTS

According to an embodiment, multiple computer systems are operable to execute a software application (i.e., an application). One of the computer systems is selected to execute the application based at least on the power consumption of the computer system if the computer system were to execute the application. Thus, a prediction is made as to the future power consumption of the computer system. Future power consumption is also determined for at least one other computer system. The computer system having the lowest future power consumption may be selected for executing the application.

According to an embodiment, future power consumption and other metrics may be determined for a computer system based on predicted future utilizations of computer resources by a workload of the computer system. The workload may include the application if it were executed on the computer system at a future time and any other applications or processes that impact the utilization of computer resources at the future time. Computer resources may include number of processor cycles used, amount of memory used, amount of input/output (I/O) traffic generated, etc.

In one embodiment, the future utilizations of computer resources are determined based on current utilizations. Using a function (e.g., weighted averaging, exponential averaging, etc.) the future computer resource utilizations are calculated from recent measurements of the computer resource utilizations. Also, future computer resource utilizations may be determined based on previous runs of the application on similar computer systems or may be based on previous runs of similar applications (e.g., prior to the application ever being executed on any of the computer systems).

In addition to future power consumption, other variables may be considered when selecting a computer system to execute the application. The other variables may include the maximum capacity of the computer resources, service level agreement (SLA) performance requirements, heat extraction capabilities for the computer systems, nominal power consumption, etc.

A computer system may be selected prior to executing the application and/or while the application is executing. For example, after the initial execution of the application, the application may be migrated to another computer system if a determination is made that one or more variables, which may include future power consumption, are more optimal if another computer system executes the application. The variables may be periodically evaluated while the application is executing. For example, the evaluation may be performed at predetermined intervals or at different phases of the application executing.

Figure 1:
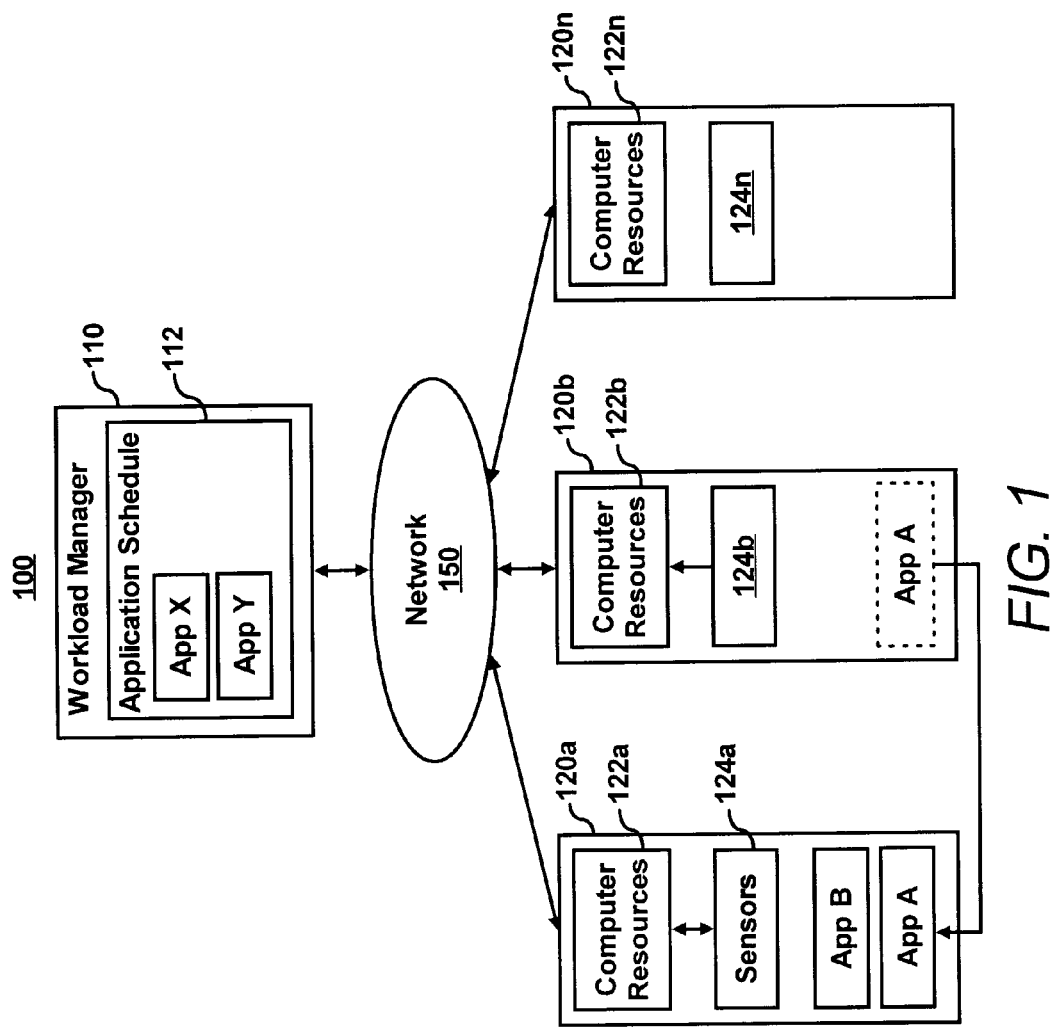
FIG. 1 illustrates a block diagram of a system, according to an embodiment of the invention.

FIG. 1 illustrates a system 100, according to an embodiment of the invention. The system 100 includes multiple computer systems 120a . . . n. Computer resources 122a . . . n and sensors 124a . . . n are shown for the computer system 120a . . . n. The computer resources 122a . . . n may include processors, memories, storage devices (e.g., hard drives, etc.), network interfaces, etc. Each of the computer systems 120a . . . n may execute several applications. The computer resources 122a . . . n are used to execute the applications. The sensors 124a . . . n measure the utilizations of the computer resources used to execute the applications. For example, the sensors 124a may measure the number of processor cycles used to execute an application B on the computer system 120a, the amount of memory used by the application B, the I/O traffic generated by the application B, etc. The measured utilizations may be used to predict future utilization of the computer resources 122a by each application executed on the computer systems 120a . . . n. In addition to measuring the utilizations of the computer resources, the sensors 122a . . . n may include one or more power measure circuits for measuring the power consumption of the computer system 120a . . . n and thermal sensors measuring the heat in the vicinity of the computer system 120a . . . n. The sensors 122a . . . n may include known measuring circuits and/or software for measuring the desired metric (computer resource utilization, power, heat, etc.).

The computer systems 120a . . . n are connected to a workload manager 110, for example, via a network 150. The workload manager 110 manages the applications executing on the computer systems 120a . . . n. In one embodiment, the workload manager 110 matches applications with particular computer systems 120a . . . n based on at least future power consumption.

For example, the workload manager 110 compares the computer system 120a with the computer system 120b to determine which computer system will execute the application A already being executed on the computer system 120b. The workload manager 110 evaluates computer system 120a by at least predicting the power consumption (i.e., future power consumption) of the computer system 120a if the computer systems 120a were to execute the application A in addition to its existing workload (e.g., the application B). The existing workload may include other applications or processes that would be executed when and if the application A were to be executed. This typically includes applications, such as application B, that are included in the current or existing workload of the computer system 120a. However, if any of the applications will finish executing in the near future (e.g., close to the time that application A starts executing), then utilizations of computer resources for these applications may not be considered when determining future power consumption. The workload manager 110 evaluates at least one other computer system, in this example computer system 120b, and selects one of the evaluated computer systems to execute the application. The workload manager 110 may determine that the computer system 120a has the lower future power consumption. Accordingly, the workload manager 110 instructs the computer system 120b to migrate the application A to the computer system 120a.

The workload manager 110 may also select one of the computer systems 120a . . . n to execute an application that is not currently running, such as one of the applications X or Y which may be scheduled to execute in the near future. Similarly, a computer system with the lowest future power consumption may be selected by the workload manager 110 to execute the applications X and/or Y.

In one embodiment, the future power consumption is calculated from the measurements taken by the sensors 124a and 124b (e.g., utilizations of the computer resources 122a and 122b, measured power consumption of the computer systems 120a and 120b, etc.) and transmitted to the workload manager 110. This embodiment may be used when the application is already running, such as with the application A, and the workload manager 110 is determining whether to migrate the application to another one of the computer systems 120a . . . n that may be more optimal (e.g., consume less power) to execute the application. In another embodiment, the future power consumption may be based on previous runs of the application on a similar computer system, runs of a similar application on a similar computer system, etc. This embodiment may be beneficial if the application has never been executed in the system 100 or if the workload manager 110 is selecting one of the computer systems 120a . . . n to execute the application before the application is running, such as with the applications X and Y. However, techniques from both embodiments may be used together to select a computer system to execute the application at any time (e.g., prior to the application running or when the application is running).

In addition to power consumption, the workload manager 110 may consider other variables when selecting one of the computer systems 120a . . . n to execute an application. Other variables may include maximum capacity of computer resources, predetermined application performance level requirements, heat extraction capabilities for the computer system, nominal power consumption, etc. The maximum capacity of the computer resources may be based on predicted utilizations of, for example, the computer resources 122a if the computer system 120a were to execute the application A and existing workload. The workload manager 110 may not select the computer system 120a to execute the application A if the predicted utilization of any of the computer resources 122a exceeds a maximum capacity of a respective resource. For example, if a predicted memory usage of the computer system 120a exceeds a maximum capacity of a memory (not shown) in the computer system 120a, then the computer system 120a may not be selected by the workload manager 110 to execute the application A. Similarly, the application A may have predetermined performance level requirements, such as provided in a SLA. If the predicted utilizations suggest that the computer system 120a may not be able to meet the predetermined requirements, then the computer system 120a may not be selected.

Another variable considered by the workload manager 110 may include heat extraction capabilities for the computer system 120a. For example, if the computer system 120a is provided in a data center, the computer system 120a may be provided in an area of the data center that is not as efficient to cool as another area. Thus, a computer system located in a different area of the data center may be selected to execute the application. This is further illustrated with respect to FIG. 4.

Figure 2:
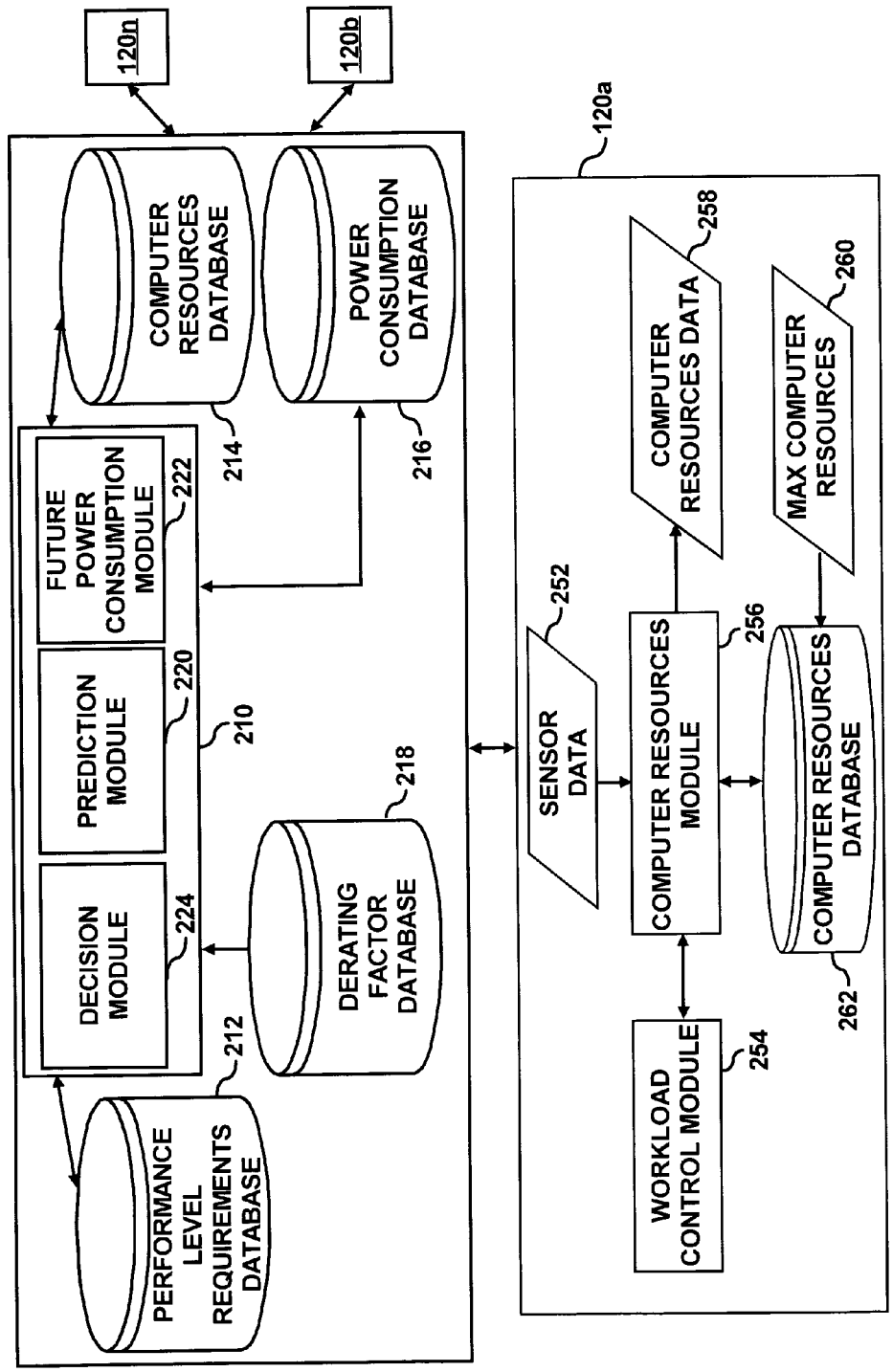
FIG. 2 illustrates a software architecture of components of the system of FIG. 1, according to an embodiment of the invention.

FIG. 2 illustrates a software architecture 200 of the system 100 of FIG. 1, according to an embodiment of the invention. The computer system 120a includes a computer resources module 256 that receives sensor data 252 measured from the sensors 124a of FIG. 1. The sensor data 252 may include measured utilizations of the computer resources 122a of FIG. 1, power consumption measurements, heat dissipation or temperature measurements, etc. The temperature measurements may include the temperature measured in the vicinity of the computer system 120a. The measured utilizations may include the measured utilization of computer resources 122a by each application executing on the computer system 120a. The computer resources module 256 may store the sensor data 252 in a computer resources database 262.

In one embodiment, the computer resources module 256 calculates tuples for a time period Ts from the sensor data 252. For example, the sensor data 252 includes measured utilizations of the computer resources 122a. The computer resources module 256 generates from the sensor data 252 the utilizations of each of the computer resources 122a over a period of time Ts, thus building an N-dimensional tuple (R1, R2 . . . Rn) for the time period Ts. Each dimension R of the tuple corresponds to a particular computer resource of the computer resources 122a being measured. At the end of the time period Ts, the computer resources module 256 determines the average power consumption during the time period Ts and the average ambient temperature in the vicinity of the computer system 120a. Thus, the computer resources module 256 determines the power P and the temperature T for a time period Ts as a function of the tuple (e.g., P(R1s, R2s, . . . Rns) and T(R1s, R2s, . . . Rns)). Also, tuples may be determined for each application executing on the computer system 120a. The tuples and the associated power and temperature data may be stored in the computer resources database 262. Also, the tuples and associated power and temperature data are transmitted to the workload manager 110 as being included in the computer resources data 258. The other computer systems 120b . . . n may transmit similar information to the workload manager 110. In another embodiment, the measured utilizations of the computer resources, the measured power consumption and the measured temperature are transmitted to the workload manager 110. Then, the workload manager 110 generates the tuples, for example, for the time period Ts and determines power and temperature data for the time period Ts, such as the average power consumption and temperature for the time period Ts. The tuples are described in further detail below with respect to FIG. 3.

The computer resources database 262 may also store maximum computer resources data 260. The maximum computer resources data 260 may include the maximum capacities of the computer resources 122, such as amount of memory, processor speed, maximum power available from power supplies providing power to the computer system 120a, etc. The computer resource module 256 transmits the maximum computer resources data 260 to the applications manager 210 as part of the computer resources data 258. Thus, the computer resources data may include the sensor data 252, the maximum computer resources data 260, and/or the tuples and associated power and temperature data. Instead of storing the sensor data 252 in a database, such as the computer resources database 262, the sensor data 252 may be stored temporarily in the computer system 120a and transmitted periodically to the workload manager 110. Also, the maximum computer resources data 260 may be stored at the workload manager 110. For example, a system administrator may input the maximum computer resources data 260 into the computer resources database 214 at the workload manager 110. The computer systems 120b . . . n include software architectures similar to the computer system 120a, and the computer systems 120b . . . n are also operable to transmit respective computer resources data to the workload manager 110.

In one embodiment, the maximum computer resources data 260 may include the maximum power output of power supplies (not shown) supplying power to the computer systems 120a . . . n, wherein the power supplies are designed based on nominal power consumption of the computer systems. For example, redundant power supplies are typically designed to support a load individually, even though the redundant power supplies share the load equally for a substantial majority of the time the computer system is running. This type of over provisioning leads to increased costs due to the expense of using larger power supplies and power supply accessories, such as wires with greater current ratings. Accordingly, power supplies designed based on nominal power consumption (e.g., average power consumption of the computer system) are provided. However, these power supplies may have a lower maximum power output, and increasing the load, such as by adding more applications to the computer system, may cause the computer system to consume more power. Accordingly, the workload manager 110 may use a threshold below the maximum power output of the power supplies to determine whether a computer system may be selected to execute an application. Determining nominal power consumption of a computer system, and using a threshold to determine whether to control workload of a computer system based on a system using nominally designed power supplies is further described in commonly assigned U.S. patent application Ser. No. 10/608,206, entitled, "Controlling Power Consumption of at Least One Computer System", herein incorporated by reference in its entirety.

The workload manager 110 includes applications manager software 210 operable to select one of the computer systems 120a . . . n to execute an application based on the computer resources data 258 received from the computer systems 120a . . . n. The workload manager 110 includes computers resources database 214 storing the computer resources data received from the computer systems 120a . . . n and other associated data calculated from the computer resources data from the computer systems 120a . . . n. The workload manager 110 also includes a power consumption database 216 storing computer resource utilization data, power consumption data, temperature data, etc., which may be used for calculating future power consumption and future temperature for a computer system, a derating factor database 218 storing information associated with applications in contention or having commonalities, and a performance level requirement database 212 storing predetermined application performance requirements such as provided in SLAS.

The applications manager software 210 evaluates future power consumption and/or other variables to determine which of the computer systems 120a . . . n will be used to execute an application. In order to determine future power consumption of a computer system, e.g., for the computer system 120a, a prediction module 220 calculates predictions of the future utilizations of the computer resources 122a by each application executing on the computer system 120a.

The future utilizations of the computer resources 122a may be determined using the computer resources data 258 shown in FIG. 2 received from the computer system 120a, which may include the tuples and associated power and temperature data generated from the sensor data 252 shown in FIG. 2. Conventional application monitoring software may be used to measure computer resource utilizations by each application and to determine whether performance level requirements for each application are being met by the respective computer system.

In one embodiment, the prediction module 220 uses a prediction function (e.g., weighted average, exponential average, etc.) to calculate a prediction of the utilization of a computer resource per application. For example, applications A and B are executed by the computer system 120a, such as after the application A is migrated to the computer system 120a shown in FIG. 1. The computer resources data 258 received from the computer system 120a and stored in the computer resources database 214 may include tuples for different periods of time during the execution of the applications A and B. FIG. 3 illustrates, for application A, the tuples for the consecutive time periods Ts, Tt, and Tu (shown in rows 310–330). For each of the time periods, resource utilizations R1–Rn are stored. Resource utilizations R1–Rn are the measured utilizations of each of the computer resources 122a shown in FIG. 1. Also, power and temperature data for each of the time periods is also stored in the computer resources database 214. The prediction module 220 may calculate a moving or exponential average for the computer resource R1 from recent time periods. For example, a moving average may be calculated from R1s(A), R1t(A), and R1u(A) to generate a predicted value utilization of the computer resource R1 (i.e., R1future(A)). Predictions may be similarly calculated for the computer resources R2–Rn (shown in row 340 of FIG. 3). This process is repeated for each application comprising the workload of the computer system 120a, which in this example includes application B. Rows 350–370 illustrate tuples for application B, and row 380 illustrates future computer resource utilizations for the application B. Then, the predicted values for each resource and each application are summed. For example, R1future(A) for application A is summed with R1future(B) of application B to generate a total predicted value for the resource R1 (i.e., R1total) based on the computer resource utilizations of applications A and B executing on the computer system 120a (shown in row 390).

The derating factor database 218 may store derating values for particular applications executed by a single computer system. For example, applications A and B may have derating factors for particular resources that are in contention or are commonly used by the applications A and B. Resource R1 may have a commonality for applications A and B, and thus R1total may be reduced by a predetermined amount, such as provided in the derating factor database 218. Resource R2 may be in contention when being used by the applications A and B, and thus R2total may be increased to account for the contention. An example of a commonality includes the mutual sharing of a file or data. The sharing of information may reduce access time because both applications are executing on the same computer system and access times to the information will be amortized across both applications. Another example of a commonality includes may include the reduction of inter-application synchronization times. Executing the applications on the same computer system may reduce inter-application synchronization times, thereby using fewer processor cycles by reducing the time the applications spends in a synchronization loop. Some contentions may include increased contention of memory resulting in more cache misses, more page swapping, greater access times if memory bandwidth becomes a critical resource, and increased contention for critical locks which may protect key operating system data structures.

The derating factor database 218 may be used as a lookup table to determine whether any derating factors are applicable for simultaneously executing applications. The derating factors stored in the derating factor database 218 may be based on previous executions of applications. In one embodiment, the application manager software 210 periodically evaluates the derating factor. An evaluation may be performed repeatedly whenever two applications, such as applications A and B, are executed on the same computer system. During the evaluation, the application manager software 210 determines the utilizations of resources R1 . . . Rn by each application individually and the overall utilization of the workload of the computer system executing the applications. For example, tuples for each application (e.g., T(A) and T(B)) and a tuple for the workload (e.g., T(C)) are determined from resource utilization measurements. Hence, for a single resource Rx of the resources R1–Rn, the application manager software 210 records three values: Rx(A), Rx(B), and Rx(C). The application manager software 210 then computes the derating factor for the resource Rx as the ratio (Rx(A)+Rx(B))/(Rx(C)). The tuple thus formed is stored in the derating factor database 218 and indexed as the tuple formed by the vector sum of T(A) and T(B).

After the derating factors are applied to the predicted value totals, a future power consumption is determined for the computer system 120a by the future power consumption module 222. For example, the power consumption database 216 may store a lookup table including tuples and related power consumptions. The lookup table may be populated with measured tuples, including power consumption and temperature data, transmitted from the computer system 120a in the computer resources data 258 of FIG. 2. The future power consumption module 222 compares the tuple comprised of the resource totals (shown in row 390 of FIG. 3) to a similar tuple in the power consumption database 216, which may include the lookup table. Thus, the associated power consumption identified from the power consumption database 216 based on the predicted computer resource utilizations for the computer system 120a is the future power consumption (i.e., Ptotal) of the computer system 120a.

According to another embodiment, the future power consumption for the computer system 120a may be determined by averaging, which may include weighted averaging, exponential averaging, etc., the power consumptions determined for each period of time, such as averaging the power consumptions Ps(A), Pt(A), and Pu(A) shown in FIG. 3. The averaging generates Pfuture(A) for application A. Similar calculations are performed for other applications comprising the workload for the computer system 120a, such as application B, to generate a future power consumption for each application. The future power consumptions for the applications are summed to determine Ptotal (i.e., the predicted future power consumption for the computer system 120a). Derating factors may also be applied in this embodiment. For example, a predetermined derating factor associated with temperature and/or computer resources R1–Rn are applied based on known commonalities and contentions between applications A and B.

Similarly to determining the future power consumption (i.e., Ptotal) of the computer system 120a, a predicted future temperature (i.e., TEMPtotal) in the vicinity of the computer system 120*a* may also be determined by the workload manager 110.

As described above for determining future power consumption for the computer system 120*a*, predicted computer resource utilizations R1total-Rntotal, such as shown in row 390 of FIG. 3, are determined, for example, by the prediction module 220 of FIG. 2. Future computer resource utilizations for the application A, such as shown in row 340 of FIG. 3, and future computer resource utilizations for application B, such as shown in row 380 of FIG. 3, are determined by the prediction module 220 of FIG. 2. Then, the predicted values for each resource and each application are summed. For example, R1future(A) for application A is summed with R1future(B) of application B to generate a total predicted value for the computer resource R1 (i.e., R1total) based on the computer resource utilizations of applications A and B executing on the computer system 120*a* (shown in row 390).

Derating factors may be applied to any of the totals R1total-Rntotal to account for commonalities or contentions between the applications A and B. Because of commonalities and contentions between applications of the workload for the computer system 120*a*, the utilizations of one or more of the computer resources R1–Rn may be increased or decreased. This may result in increased or decreased heat dissipation by the components of the computer system. Derating factors take into account contentions and commonalities between the application A and B, and applied to the computer resource totals, for example, by increasing or decreasing any of the totals R1total-Rntotal to account for commonalities or contentions between the applications A and B.

A lookup table in the database 216 may be used to determine the future temperature for the computer system 120*a*. For example, the power consumption database 216 may store a lookup table including tuples and related temperatures. The lookup table may be populated with measured tuples, including power consumption and temperature data, transmitted from the computer system 120*a* in the computer resources data 258 of FIG. 2. The future power consumption module 222 compares the tuple comprised of the resource totals (shown in row 390 of FIG. 3) to a similar tuple in the power consumption database 216, which may include the lookup table. Thus, the associated temperature identified from the power consumption database 216 based on the predicted computer resource utilizations for the computer system 120*a* is the future temperature (i.e., TEMPtotal) of the computer system 120*a*.

In another embodiment, the future temperature of the computer system 120*a* may be determined by averaging, which may include weighted averaging, exponential averaging, etc., the temperatures determined for each period of time, such as averaging the temperatures TEMPs(A), TEMPt(A), and TEMPu(A) shown in FIG. 3. TEMPs(A), TEMPt(A), and TEMPu(A) may include measured temperatures for respective time periods. The averaging generates TEMPfuture(A) for application A. Similar calculations are performed for other applications comprising the workload for the computer system 120*a*, such as application B, to generate a future temperature for each application. The future temperatures for the applications are summed to determine TEMPtotal (i.e., the predicted future temperature for the computer system 120*a*). Derating factors may also be applied in this embodiment. For example, a derating factor associated with temperature is applied based on known or determined commonalities and contentions between applications A and B.

In the embodiments described above, future power consumption is determined for a first computer system (e.g., the computer system 120*a*), which is currently executing the application A and existing workload (e.g., the application B). Future power consumption is also determined for at least one other computer system, such as the computer system 120*b*, which may be based on predicted computer resource utilizations of the applications executing on the computer system 120*b*, including the application A which may be migrated from the computer system 120*a*. If the application A was previously executed on the computer system 120*b*, then previous measurements (e.g., tuples) of computer resource utilizations for the computer system 120*b* executing the application A are used to determine future power consumption and temperature for the computer system 120*b* executing the application A and existing workload. If the application A has never been executed by the computer system 120*b*, then tuples determined for a platform similar to the computer system 120*b* may be used to determine future power consumption and temperature for the computer system 120*b* executing the application A and existing workload.

The decision module 224 selects one of the computer systems 120*a* and 120*b* to execute the application A. For example, if the computer system 120*b* has a lower future power consumption, then the decision module 124 instructs the computer systems 120*a* and 120*b* to migrate application A to the computer system 120*a*, assuming that the application A is currently executing on the computer system 120*a*. The workload control module 254, such as shown for the computer system 120*a* and may be included in each of the computer systems 120*a* . . . *n*, performs the migration. Migrating the application A may include saving the state of the application A and data used by the application A to the computer system 120*b*.

Future temperature is also determined for the other computer system(s), for example, the computer system 120*b*. The future temperature may also be considered by the decision module 224 when selecting a computer system to execute an application. For example, the future temperature in the vicinity of the computer system 120*a* (i.e., TEMPtotal shown in FIG. 3 and described above) is compared to the calculated future temperature of another computer system (e.g., the computer system 120*b*) if the computer system 120*b* were to execute the application A and existing workload. If the difference between the future temperatures exceeds a predetermined amount then the computer system with the lower future temperature may be selected to execute the application.

A difference in future temperatures for computer systems may be the result of one of the computer systems being located in a hot spot. FIG. 4 illustrates an embodiment of the system 100 shown in FIG. 1 provided in a data center 400. The data center 400 may include a location, e.g., a room that houses numerous electronic packages (e.g., computer systems, power supplies, mass storage devices, etc.) typically in racks. The data center 400 comprises multiple racks 410*a* . . . *n*, each housing multiple computer systems. The computer systems 120*a* . . . *n* of FIG. 1 may be housed in one or more of the racks 410*a* . . . *n*. A standard rack may be defined as an Electronics Industry Association (EIA) enclosure, 78 in. (2 meters) wide, 24 in. (0.61 meter) wide and 30 in. (0.76 meter) deep. Standard racks may be configured to house a number of computer systems, e.g., about forty (40) to eighty (80).

The computer systems housed in the racks 410*a* . . . *n* dissipate relatively significant amounts of heat during their operation. For example, a typical computer system comprising a system board, multiple microprocessors, power supply, and mass storage device may dissipate approximately 250 W of power. Thus, a rack containing forty (40) computer systems of this type may dissipate approximately 10 KW of power. Each rack 410a . . . n may include a cooling system 420a . . . n for removing the heat dissipated by the computer systems. However, if a rack is in a location in the data center 400 that tends to be warmer than another area of the data center 400, then the cooling system for the rack in the warmer area may be required to distribute more cooling fluid and as a result consume more power to remove the heat dissipated by the computer systems. This is further illustrated using locations 430 and locations 440 shown in FIG. 4. Based on temperature measurements determined using the sensors 124a of FIG. 1 and the calculated future temperature (e.g., TEMPtotal shown in FIG. 3), the workload manager 110 may determine that the location 430 is generally 20–30 degrees cooler than the location 440. The difference in temperature between the location 430 and 440 may be caused by a variety factors. For example, the location 430 may be closer to a computing-room-air conditioning unit (CRAC) for the data center 400, which causes the location 430 to receive a greater volume of cooler air from the CRAC. This is illustrated by CRACs 450 and 460 used to cool the data center 400. The location 430 is closer to the CRAC 450 than the location 440 is to the CRAC 460. If the difference in future temperatures of computer systems, for example, located in the locations 430 and 440 is greater than a predetermined threshold, then the computer system in the cooler location (e.g., the location 430) may be selected to execute an application. Although the workload manager 110 is shown external to the data center 400, the workload manager 110 may be implemented on a computer system provided in the data center 400.

Referring again to FIG. 2, the decision module 224 of the applications manager software 210 may consider variables other than future power consumption and future temperatures when selecting a computer system to execute an application. For example, if any of the predicted future computer resource utilizations, such as shown in row 350 of FIG. 3, exceeds a maximum computer resource utilization for the respective resource, which may be determined from data retrieved from the computer resources database 214, then another computer system may be selected. For example, if R1total corresponds to 50 processor cycles, and the computer system 120a can only provide 30 processor cycles, then another computer system may be selected.

Also, performance level requirements for an application, such as stored in the performance level requirement database 212, may also be considered by the decision module 224. Performance level requirements may be provided by a user, for example, in a SLA. The performance level requirements may include minimum CPU availability, minimum memory, and minimum disk space required, etc. for executing the applications. If, for example, performance level requirements for the application A cannot be met by the computer system 120a because the application B executed by the computer system 120a is using a majority of the CPU time, then the decision module 224 may select another computer system to execute the application A. These and other variables may be considered by the applications manager software 220 when selecting a computer system to execute an application. Furthermore, these variables may be evaluated regardless of whether the applications software manager 220 is determining whether to migrate an application to another computer system or selecting a computer system prior to the application being run.

Figure 5A:
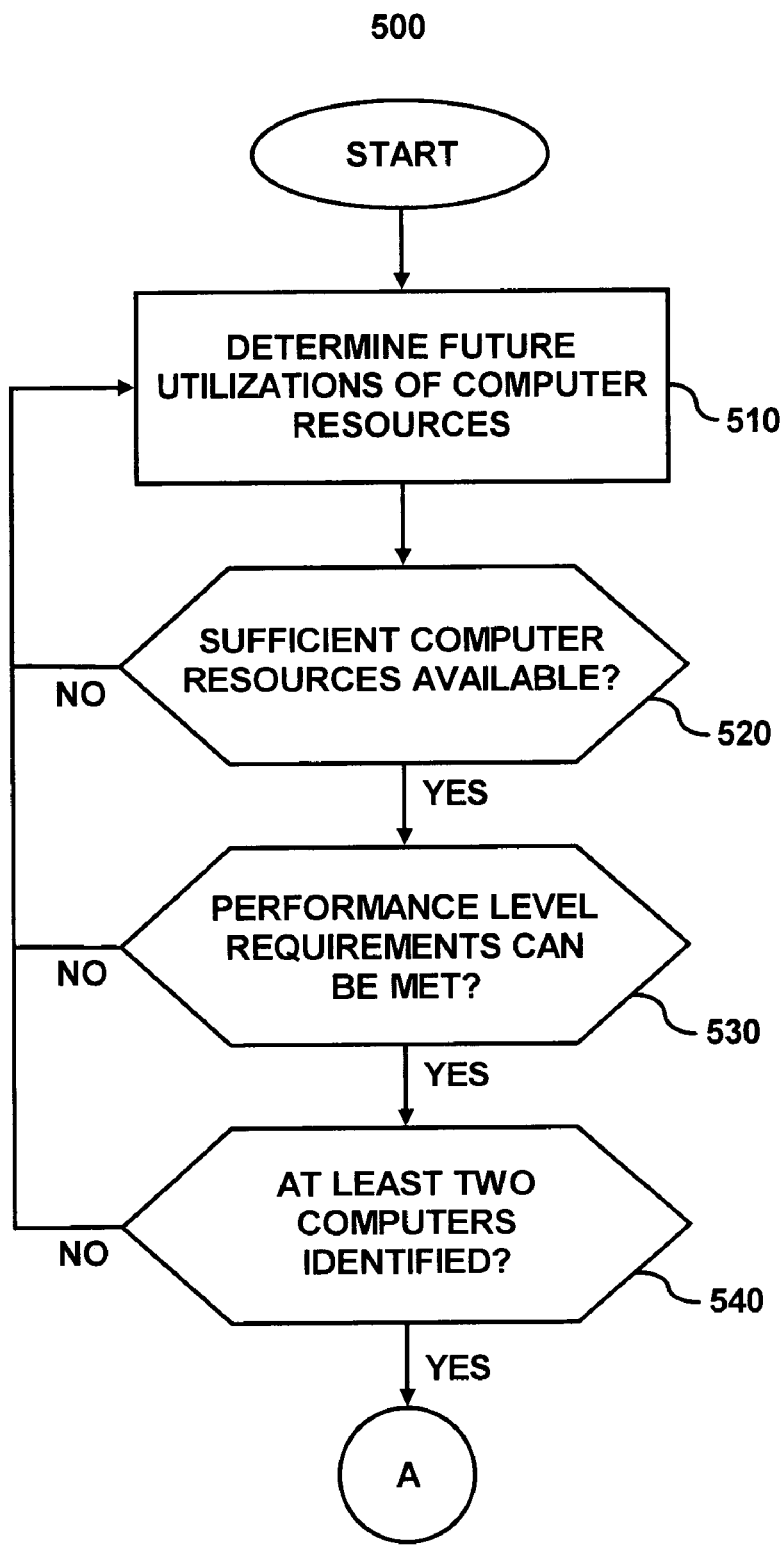
FIGS. 5A–5B illustrate a flow chart of a method for selecting a computer system to execute an application, according to an embodiment of the invention.
Figure 5B:
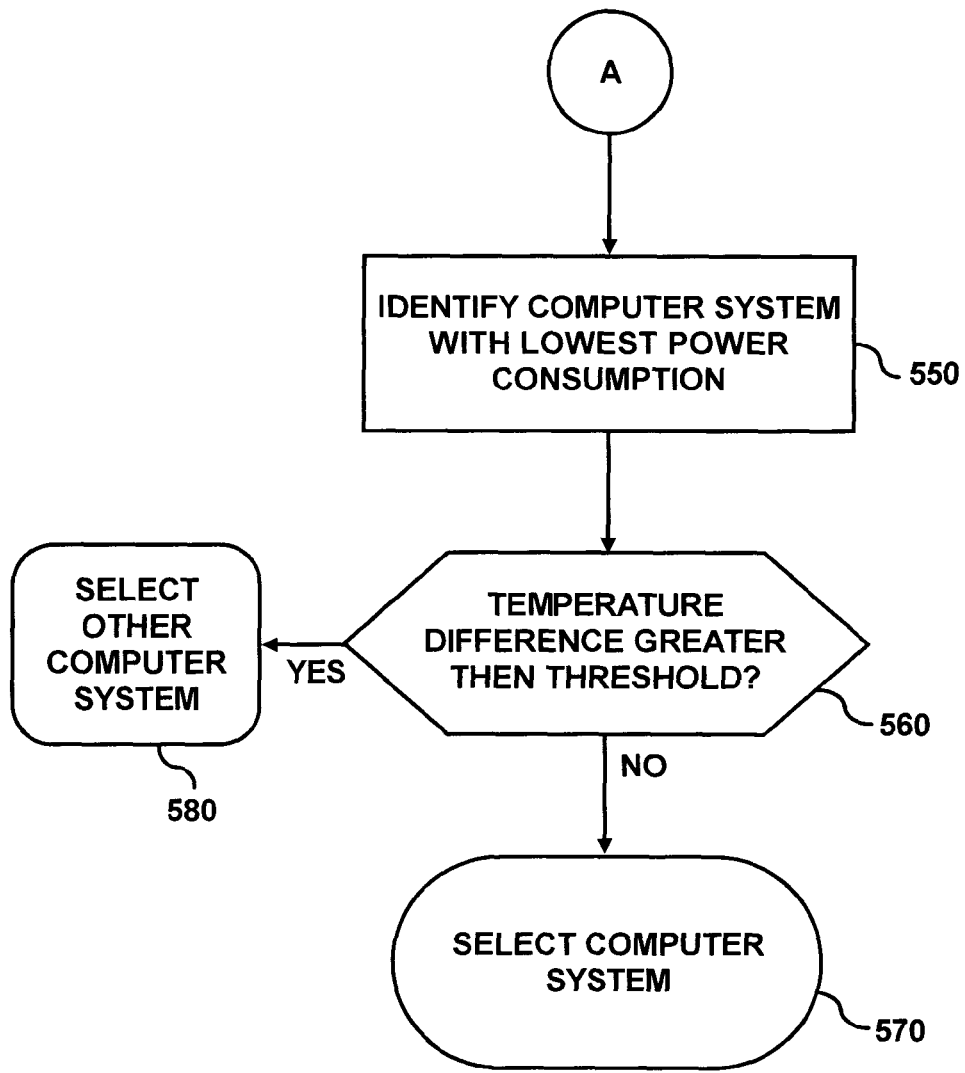
Figure 6:
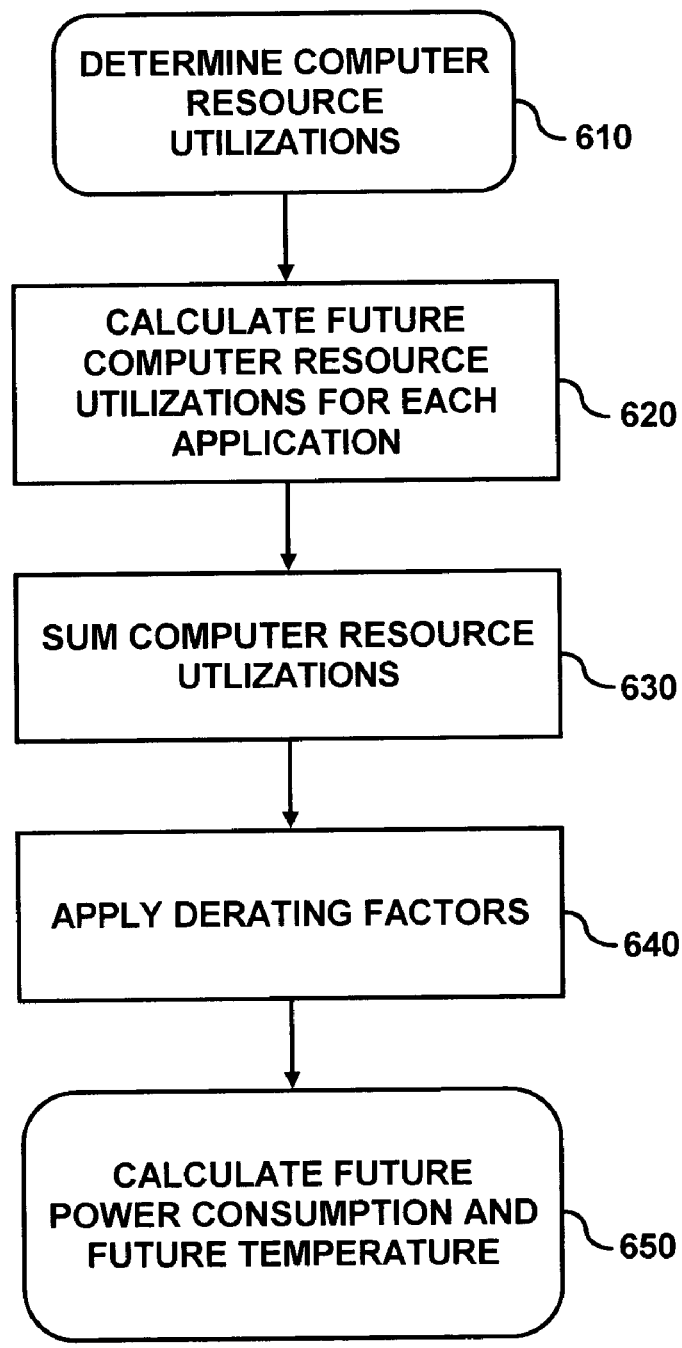
FIG. 6 illustrates a flow chart of a method for calculating future power consumption and temperature, according to an embodiment of the invention.

FIGS. 5A–B and 6 illustrate flow charts of methods that include steps which may be performed by the workload manager 110 shown in FIGS. 1, 2, and 4. The FIGS. 5A–B and 6 are described below with respect to FIGS. 1–4 by way of example and not limitation.

FIGS. 5A–B illustrate a method 500 for selecting a computer system to execute an application, according to an embodiment of the invention. At step 510, the workload manager 110 determines the future utilization of each computer resource for a computer system if the computer system were to execute the application and existing workload. For example, a predicted utilization for each of the computer resources 122 (e.g., such as shown in row 350 of FIG. 3) is determined for the computer system 120a by the prediction module 220 shown in FIG. 2.

At step 520, the workload manager 110 determines whether any of the future utilizations of the computer resources exceeds a maximum capacity of a computer resource. For example, if the future utilization of a hard drive in the computer system 120a is determined to be 130 gigabytes, which may include future utilization of the applications A and B executed by the computer system 120a, and the computer system 120a only has a 120 gigabyte hard drive, then the computer system 120a is not selected to execute the application A. On the other hand, if the computer system 120a has a 150 gigabyte hard drive, then the workload manager 110 may select the computer system 120a to execute the application A.

At step 530, the workload manager 110 determines whether performance level requirements for the application can be met by the computer system. For example, minimum performance requirements (e.g., minimum CPU time, minimum memory available, minimum hard drive space, etc.) may be specified in a SLA for the application. The future utilizations for the computer resources, such as determined at step 510, are compared to associated performance level requirements. If the computer system cannot meet the performance level requirements, then another computer system may be selected. If the computer system can meet the performance level requirements, then that computer system may be selected.

At step 540, the workload manager 110 determines whether at least two computer systems have been identified that have sufficient computer resources available (step 520) and can meet the application performance level requirements (step 530). For example, the workload manager 110 may perform steps 510–530 for different computer systems until at least two computer systems are identified that may execute the application. If only one computer system is available that has sufficient computer resources and/or can meet performance level requirements, then that computer system may be selected to execute the application. However, at least two computer systems may typically be identified, especially in large data centers. Furthermore, more than two computers may be identified to find a computer system most optimal for executing the application based on the variables described herein.

Steps 550–580 of the method 500 are shown in FIG. 5B. At steps 550 and 560, the at least two computer systems identified in the previous steps are compared. For example, computer systems 120a and 120b are identified by the workload manager 110 as computer systems that may be able to execute the application. At step 550, the workload manager 110 determines the future power consumptions of the computer systems 120a and 120b. For example, the future power consumption module 222 calculates the future power consumptions using computer resources data from the database 214. The decision module 224 identifies the computer system with the lowest future power consumption.

At step 560, the workload manager 110 determines whether the temperature difference in the vicinity of each of the computer systems 120a and 120b is greater than a threshold. For example, if the computer system 120a has the lowest future power consumption, but the computer system 120a is located in a hot spot in a data center (e.g., the location 440 shown in FIG. 4) such that the temperature of computer system 120a is greater than the temperature of the computer system 120b by a predetermined amount, then computer system 120b may be selected (step 580). Otherwise, computer system 120a is selected to execute the application (step 570).

After the computer system is selected to execute the application at one of steps 570 and 580, the application may be migrated to the selected computer system. For example, the computer system 120a may be currently executing the application and the computer system 120a is periodically monitored along with at least one other computer system (e.g., computer system 120b or any other computer system) to identify a computer system to execute the application. If the application is currently executing on the computer system 120a and computer system 120b is selected by the decision module 224 of FIG. 2 to execute the application, then the application is migrated from the computer system 120a to the computer system 120b. If, however, the decision module 224 selects computer system 120a to execute the application, then the application continues to execute on the computer system 120a. In another embodiment, if the application is not currently executing, e.g., prior to the application being scheduled to execute, then the computer system selected at one of steps 570 and 580 starts executing the application.

It will be apparent to one of ordinary skill in the art that an application may include portions executed on multiple computer systems. For example, information retrieval functions for an application may be executed on one computer system while data processing functions for the application may be executed on another computer system. Thus, future power consumption and future temperature may be evaluated for a portion of an application being executed or to be executed on a computer system for selecting a computer system to execute the portion of the application.

One or more of the steps of the method 500 may be omitted or performed in different orders. For example, step 530 and step 560 may be optional. Also, step 530 may be performed before step 520 and step 560 may be performed before step 550. Accordingly, the method 500 may be modified by these and other variations apparent to one of ordinary skill in the art.

FIG. 6 illustrates a method 600 for determining future computer resource utilizations, future power consumption, and future temperature for a computer system, such as performed at step 510 and step 550 of the method 500. At step 610, utilizations for computer resources in a computer system are determined by the workload manager 110. For example, the prediction module 220 of FIG. 2 retrieves computer resource utilizations (e.g., tuples) for the computer system 120a from the computer resources database 214. The computer resources database 214 may be populated with computer resource utilization information received from the computer systems 120a . . . n. At step 620, the prediction module 220 calculates the future computer resource utilizations for each application to be executed on the computer system 120a. This includes the application the workload manager 110 is currently placing, and likely includes the majority of the existing workload of the computer system 120a. The prediction module may use a prediction function, such as weighted averaging, exponential averaging, etc., of the tuples for the computer system 120a to determine future computer resource utilizations for each application.

At step 630, the prediction module 220 sums the computer resource utilizations for each application. At step 640, the prediction module applies a derating factor for one or more of the summed computer resource utilizations. The derating factor may include a factor for increasing or decreasing a particular, summed, computer resource utilization depending on whether any of the applications contend for the particular computer resource or have commonalities for the particular computer resource.

At step 650, the future power consumption module 22 determines a future power consumption and future temperature for the computer system 120a based on the future computer resource utilizations determined at step 630 and derating factors determined at step 640. For example, the future power consumption module 222 may execute a query in the power consumption database 216, which may include a lookup table, to find a tuple of computer resource utilizations similar to the future computer resource utilizations determined at step 640. The power consumption database 216 may be populated with tuples, such as shown in rows 310–330 of FIG. 3. Each tuple includes a power consumption and temperature. The results of the query include a tuple with a power consumption and temperature, which may be used for the future power consumption and the future temperature. Derating factors are applied to account for commonalities and contentions between applications in the workload. In another embodiment, the future power consumption and the future temperature for a computer system is calculated from the measured power consumptions and measured temperatures for each application. For example, referring to FIG. 3, TEMPfuture(A) is the future temperature for the application A calculated from the measured temperatures TEMPs(A), TEMPt(A), and TEMPu(A), and TEMPfuture(B) is the future temperature for the application B similarly calculated. TEMPtotal for the computer system 120a is the sum of TEMPfuture(A) and TEMPfuture(B), which may include applied of derating factors.

What has been described and illustrated herein are embodiments of the invention along with some of variations. The terms, descriptions and figures used herein are set forth by way of illustration only and are not meant as limitations. Those skilled in the art will recognize that many variations are possible within the spirit and scope of the invention, which is intended to be defined by the following claims and their equivalents in which all terms are meant in their broadest reasonable sense unless otherwise indicated.

What is claimed is:

1. A method of managing computer applications comprising;
   determining computer resource needs of an application;
   determining, based on the computer resource needs of the application, a first power consumption of a first computer system if the first computer system were to execute the application;
   determining, based on the computer resource needs of the application, at least one other power consumption of at least one other computer system if the at least one other computer system were to execute the application;

selecting one of the first computer system and the at least one other computer system to execute the application based on at least the first power consumption and the at least one other power consumption; and wherein the first computer system receives power from a first nominal power supply and the at least one other computer system receives power from at least one other nominal power supply, and selecting one of the first computer system and the at least one other computer system further comprises, selecting one of the first computer system and the at least one other computer system to execute the application based on whether the first nominal power supply is operable to meet the first power consumption and whether the at least one other power supply is operable to meet the at least one other power consumption.

2. The method of claim 1, wherein selecting one of the first computer system and the at least one other computer system to execute the application comprises:

determining which of the first power consumption and the at least one other power consumption is smaller;

selecting the first computer system to execute the application in response to the first power consumption being smaller than the at least one other power consumption; and selecting the at least one other computer system to execute the application in response to the at least one other power consumption being smaller than the first power consumption.

3. The method of claim 2, further comprising:

identifying performance level requirements for the application; and selecting one of the first computer system and the at least one other computer system to execute the application further comprises:

selecting the first computer system to execute the application in response to the first computer system being operable to meet the performance level requirements for the application; and selecting the at least one other computer system to execute the application in response to the at least one other computer system being operable to meet the performance level requirements for the application.

4. A method of managing computer applications comprising:

determining computer resource needs of an application;
determining, based on the computer resource needs of the application, a first power consumption of a first computer system if the first computer system were to execute the application;

determining, based on the computer resource needs of the application, at least one other power consuption of at least one other computer system if the at least one other computer system were to execute the application;

selecting one of the first computer system and the at least one other computer system to execute the application based on at least the first power consumption and the at least one other power consumption;

determining a first temperature for the first computer system;

determining at least one other temperature for the at least one other computer system;

determining whether a difference between the first temperature and the at least one other temperature exceeds a threshold; and selecting one of the first computer system and the at least one other computer system to execute the application further comprises, in response to the difference exceeding the threshold, selecting one of the first computer system and the at least one other computer system having a lower temperature.

5. The method of claim 4, wherein the first temperature comprises temperature measured in a vicinity of the first computer system and the at least one other temperature comprises temperature measured in a vicinity of the at least one other computer system.

6. A method of managing computer applications comprising:

determining computer resource needs of an application;

determining, based on the computer resource needs of the application, a first power consumption of a first computer system if the first computer system were to execute the application;

determining, based on the computer resource needs of the application, at least one other power consumption of at least one other computer system if the at least one other computer system were to execute the application;

selecting one of the first computer system and the at least one other computer system to execute the application based on at least the first power consumption and the at least one other power consumption, the selecting further comprises, determining a first utilization of computer resources for the first computer system if the first computer system were to execute the application in addition to other applications intended to be executed by the first computer system;

determining at least one other utilization of computer resources for the at least one other computer system if the at least one other computer system were to execute the application in addition to other applications intended to be executed by the at least one other computer system;

determining the first power consumption based on the first utilization of computer resources; and determining the at least one other power consumption based on the at least one other utilization of computer resources.

7. The method of claim 6, further comprising;

determining a first derating factor for the first utilization of computer resources, the first derating factor being associated with utilization of common resources by the application and the other applications intended to be executed on the first computer system;

determining at least one other derating factor for the at least one utilization of computer resources, the at least one other derating factor being associated with utilization of common resources by the application and the other applications intended to be executed on the at least one other computer system;

determining the first power consumption further comprises determining the first power consumption based an the first utilization of computer resources and the first derating factor, and determining the at least one other power consumption further comprises determining the second power consumption based on the at least one other utilization of computer resources and the at least one other derating factor.

8. The method of claim 7, wherein the first derating factor and the at least one other derating factor comprise one or more of commonalities and contentions of the common resources.

9. A method of managing computer applications comprising:
- determining computer resource needs of an application;
- determining, based on the computer resource needs of the application, a first power consumption of a first computer system if the first computer system were to execute the application;
- determining, based on the computer resource needs of the application, at least one other power consumption of at least one other computer system if the at least one other computer system were to execute the application;
- selecting one of the first computer system and the at least one other computer system to execute the application based on at least the first power consumption and the at least one other power consumption;
- wherein determining computer resource needs of an application further comprises,
  - generating resource tuples for computer resources of the first computer system, each resource tuple including an array of utilization amounts for the computer resources for a period of time;
  - wherein the generated tuples further comprise tuples generated for each application executing on the first computer system;
  - calculating a future resource utilization for each application executing on the first computer system from the generated tuples; and
  - summing the future resource utilizations for each application executing on the first computer system to determine a future utilization of the computer resources for the first computer system.

10. The method of claim 9, further comprising determining one or more of the future power consumption and future temperature of the first computer system based on the determined future utilization of the computer resources for the first computer system.

11. The method of claim 10, wherein determining computer resource needs for an application further comprises:
- generating resource tuples for computer resources of the at least one other computer system, each resource tuple including an array of utilization amounts for the computer resources for a period of time;
- wherein the generated tuples further comprise tuples generated for each application executing on the at least one other computer system;
- calculating a future resource utilization for each application executing on the at least one other computer system from the generated tupies; and
- summing the future resource utilizations for each application executing on the at least one other computer system to determine a future utilization of the computer resources for the at least one other computer system.

12. The method of claim 11, further comprising:
- determining the future power consumption of the at least one other computer system based on the determined future utilization of the computer resources for the at least one other computer system.

13. The method of claim 1, further comprising determining the first power consumption for the first computer system based on power consumption measurements of computer resources utilized by each application executing on the first computer system.

14. The method of claim 13, further comprising determining the at least one other power consumption for the at least one other computer system based on power consumption measurements of computer resources utilized by each application executing on the at least one other computer system.

15. The method of claim 1, wherein selecting one of the first computer system and the at least one other computer system to execute the application based on at least the first power consumption and the at least one other power consumption further comprises:
- selecting one of the first computer system and the at least one other computer system to execute the application based on whether the first computer system or the at least one other computer system has sufficient computer resources to execute the application.

16. The method of claim 1, wherein selecting one of the first computer system and the at least one other computer system to execute the application based on the first power consumption and the at one other power consumption further comprises:
- determining performance level requirements for the application; and
- selecting one of the first computer system and the at least one other computer system to execute the application based on whether the first computer system or the at least one other computer system can meet the performance level requirements for the application.

17. The method of claim 1, further comprising:
- performing at least some of the steps of claim 1 prior to executing the application; and
- executing the application on the selected first computer system or the selected at least one other computer system.

18. A method of managing computer applications comprising:
- determining computer resource needs of an application;
- determining, based on the computer resource needs of the application, a first power consumption of a first computer system if the first computer system were to execute the application;
- determining, based on the computer resource needs of the application, at least one other power consumption of at least one other computer system if the at least one other computer system were to execute the application;
- selecting one of the first computer system and the at least one other computer system to execute the application based on at least the first power consumption and the at least one other power consumption;
- performing at least one of the aforementioned steps after the application is executing; and
- migrating the application to the selected first computer system or the selected at least one other computer system.

19. The method of claim 1, wherein the first computer system comprises a plurality of first computer systems executing portions of the application, and the at least one other computer system comprises a plurality of other computer systems executing portions of the application.

20. A system for managing applications executing or to be executed on a plurality of computer systems, the system comprising:
- a plurality of computer systems; and
- a workload manager platform managing applications executing or to be executed on the plurality of computer systems, wherein the workload manager platform estimates power consumptions of at least two of the plurality of computer systems if the at least two computer systems were to execute an application, and the workload manager platform selects one of the at least two computer systems to execute the application based at least on a smaller one of the two estimated power consumptions;

wherein the workload manager platform estimates temperatures associated with the at least two computer systems if the at least two computer systems were to execute the application, and the workload manager selects one of the at least two computer systems to execute the application based on the estimated temperatures, the workload manager platform includes at least one database storing computer resources data received from the at least two computer systems and one or more of the estimated power consumptions and the estimated temperatures is based on the computer resources data, the at least one database stores derating factors used to adjust one or more of the estimated power consumptions and the estimated temperatures, the derating factors being based on whether applications simultaneously executing on one of the at least two computer systems results in increased or decreased use of commonly utilized computer resources by the applications.

21. The system of claim 20, wherein the plurality of computer systems are provided in a data center.

22. The system of claim 20, wherein the plurality of computer systems are connected to the workload manager platform via a network.

23. The system of claim 20, wherein the at least two computer systems comprise sensors for measuring the computer resources data.

24. The system of claim 20, wherein the at least one database stores performance level requirements for the application, and the workload manager selects one of the at least two computer systems to execute the application based on whether performance level requirements are met.

25. An apparatus comprising:
  means for determining computer resource needs of an application;
  means for determining, based on the computer resource needs of the application, a first power consumption of a first computer system if the first computer system were to execute the application and for determining at least one other power consumption of at least one other computer system if the at least one other computer system were to execute the application;
  means for selecting one of the first computer system and the at least one other computer system to execute the application based on a least the first power consumption and the at least one other power consumption; and
  storage means for storing computer resources data associated with utilizations of computer resources by the first computer system and the at least one other computer system, wherein the means for determining uses the computer resources data to determine the first power consumption and the at least one other power consumption, the storage means stores one or more of performance level requirements and derating factors used by the means for selecting to select one of the first computer and the at least one other computer system to execute the application.

26. The apparatus of claim 25, wherein the means for selecting determines which of the first power consumption and the at least one other power consumption is smaller, and selects one of the first computer system and the at least one other computer system having a smaller power consumption.

27. The apparatus of claim 25, further comprising means for determining a first temperature associated with the first computer system if the first computer system were to execute the application and for determining at least one other temperature associated with the at least one other computer system if the at least one other computer system were to execute the application, wherein the means for selecting selects one of the first computer and the at least one other computer system based on whether a difference between the first temperature and the at least one other temperature exceeds a threshold.

* * * * *

UNITED STATES PATENT AND TRADEMARK OFFICE
CERTIFICATE OF CORRECTION

PATENT NO. : 7,127,625 B2
APPLICATION NO. : 10/654473
DATED : October 24, 2006
INVENTOR(S) : Keith Istvan Farkas et al.

It is certified that error appears in the above-identified patent and that said Letters Patent is hereby corrected as shown below:

In column 14, line 58, in Claim 1, after "comprising" delete ";" and insert -- : --, therefor.

In column 15, line 53, in Claim 4, delete "consuption" and insert -- consumption --, therefor.

In column 16, line 4, in Claim 4, delete "cxceeding" and insert -- exceeding --, therefor.

In column 16, line 17, in Claim 6, delete "flrst" and insert -- first --, therefor.

In column 16, line 46, in Claim 7, after "comprising" delete ";" and insert -- : --, therefor.

In column 16, line 61, in Claim 7, delete "an" and insert -- on --, therefor.

In column 16, line 62, in Claim 7, after "factor" delete "," and insert -- ; --, therefor.

In column 17, lines 9-10, in Claim 9, delete "computcr" and insert -- computer --, therefor.

In column 17, line 53, in Claim 11, delete "tupics" and insert -- tuples --, therefor.

In column 18, line 20, in Claim 16, after "at" insert -- least --.

In column 20, line 1, in Claim 25, delete "dctermining" and insert -- determining --, therefor.

In column 20, line 10, in Claim 25, after "based on" delete "a" and insert -- at --, therefor.

UNITED STATES PATENT AND TRADEMARK OFFICE
CERTIFICATE OF CORRECTION

PATENT NO. : 7,127,625 B2
APPLICATION NO. : 10/654473
DATED : October 24, 2006
INVENTOR(S) : Keith Istvan Farkas et al.

It is certified that error appears in the above-identified patent and that said Letters Patent is hereby corrected as shown below:

In column 20, line 20, in Claim 25, delete "ofthe" and insert -- of the --, therefor.

Signed and Sealed this

Seventh Day of July, 2009

JOHN DOLL
*Acting Director of the United States Patent and Trademark Office*